(12) United States Patent
Sved

(10) Patent No.: US 6,792,568 B2
(45) Date of Patent: *Sep. 14, 2004

(54) DATA TRANSFER AND STORAGE DEVICE AND METHOD

(75) Inventor: Jorge Antonio Sved, Bristol (GB)

(73) Assignee: Hewlett Packard Development Co. LP, Houston, TX (US)

(*) Notice: Subject to any disclaimer, the term of this patent is extended or adjusted under 35 U.S.C. 154(b) by 505 days.

This patent is subject to a terminal disclaimer.

(21) Appl. No.: 09/917,865

(22) Filed: Jul. 31, 2001

(65) Prior Publication Data

US 2003/0028716 A1 Feb. 6, 2003

(51) Int. Cl.[7] ............................................. G06F 13/00
(52) U.S. Cl. ..................... 714/771; 714/758; 360/48; 360/53; 711/111; 711/154
(58) Field of Search ............................... 714/771, 758, 714/756; 360/53, 48; 711/111, 154

(56) References Cited

U.S. PATENT DOCUMENTS

| 5,293,285 A | | 3/1994 | Leonhardt et al. |
| 5,576,903 A | | 11/1996 | Brown et al. |
| 5,719,717 A | * | 2/1998 | Leonhardt et al. ............ 360/48 |
| 5,974,581 A | | 10/1999 | Nagai et al. |
| 6,018,434 A | | 1/2000 | Saliba |
| 6,092,231 A | | 7/2000 | Sze |
| 6,469,854 B1 | * | 10/2002 | Gill et al. ..................... 360/53 |

FOREIGN PATENT DOCUMENTS

| EP | 0957484 A1 | 11/1999 |
| EP | 0984451 A1 | 3/2000 |

OTHER PUBLICATIONS

"New 8 mm Is Ideal for Automated Storage," J. Gast, *Computer Technology Review* 11 (1991) Mar., No. 3, pp. 26, 28–29.

* cited by examiner

Primary Examiner—Hong Kim

(57) ABSTRACT

Data transferred from a host system to magnetic tape storage are divided into blocks that are converted, written to storage and read. An error checker determines whether errors in each block exceed a predetermined number. The result is output with corresponding header identifying information. Information, including header identifying information corresponding to each block written to storage, is stored in a history store. Header identifying information output by the error checker is compared with the header identifying information to identify the data block relating to the error checking output. The marked data block associated with the matching header identifying information is indicated as being good or bad according to the error checker. Selected parts of the header identifying information are masked to compare only the remaining portion of the information with the corresponding history store information.

18 Claims, 4 Drawing Sheets

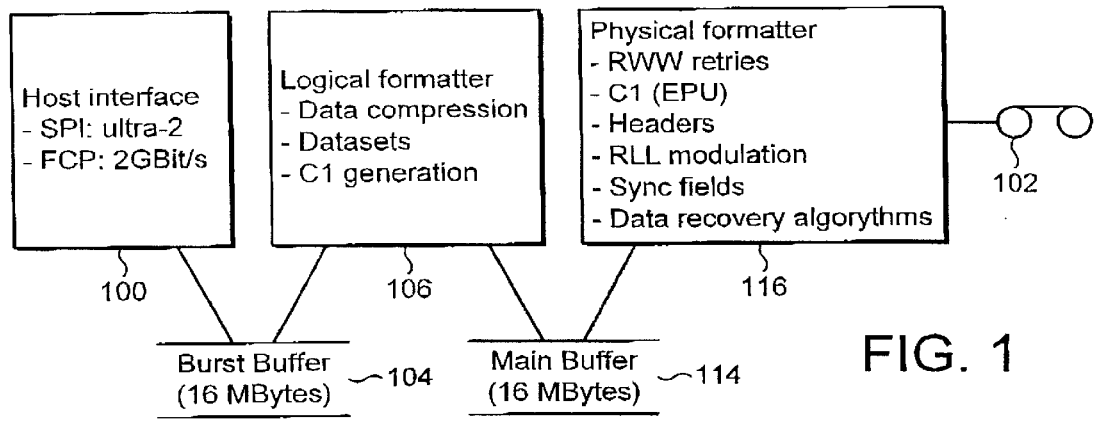
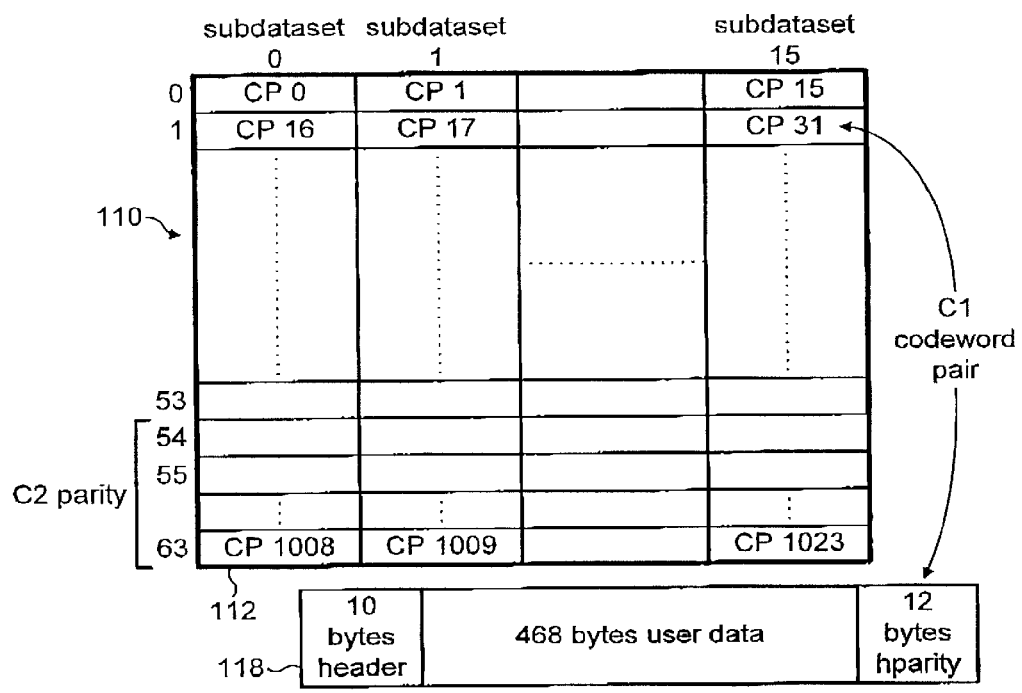
FIG. 2

| Codeword Pair Header 10 bytes | First Codeword Pair 480 bytes | Codeword Pair Header 10 bytes | Second Codeword Pair 480 bytes |

FIG. 5

| Byte positions | Length in bytes | Name of the field |
|---|---|---|
| 0 | 2 | Codeword Identifier |
| 2 | 4 | Write Pass |
| 6 | 2 | Absolute CQ Sequence Number |
| 8 | 2 | Header Parity |

FIG. 6

| a | b | c | d | e | f |

FIG. 7

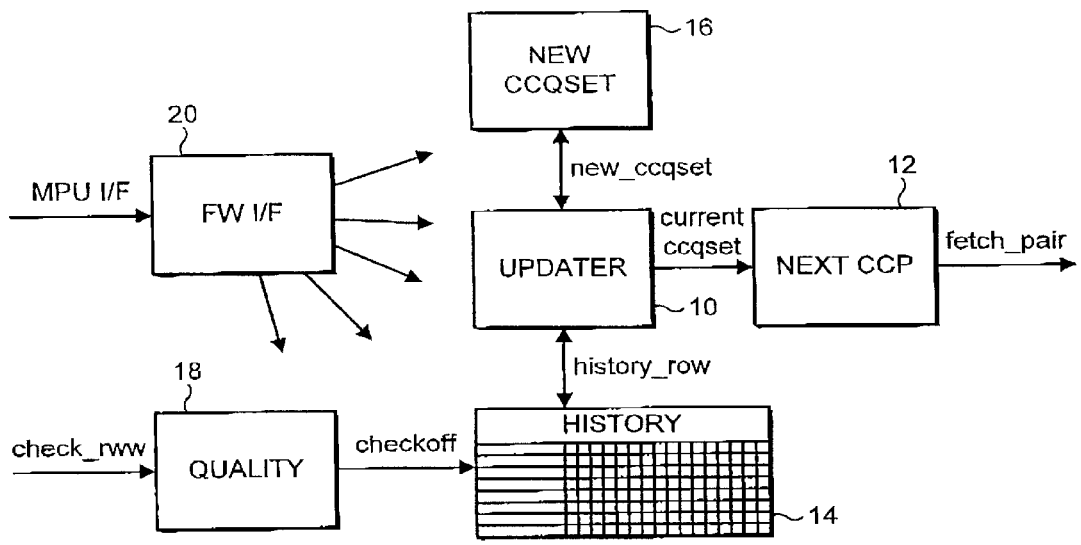

FIG. 8

| Bit name | Bit | Description |
|---|---|---|
| rww_acn_mask (3:0) | 3:0 | RWW mask for ACN part of header |
| rww_dsid_mask (3:0) | 7:4 | RWW mask for dataset ID part of header |
| rww_ccqset_mask (3:0) | 13:8 | RWW mask for CCQ Set ID part of header |
|  | 15:14 | Reserved for future use (programme 0s here) |
| rww_writepass_mask (5:0) | 21:16 | RWW mask for writepass part of header |
| rww_dataset_mask | 22 | RWW mask for ignoring dataset 0/1 altogether |
| rww_parity_mask | 23 | RWW mask for header parity 0=>Onlyperfect headers will be accepted (strict!) 1=>Allow some bit errors in header, but check all relevant *unmasked* bits |

FIG. 9

DATA TRANSFER AND STORAGE DEVICE AND METHOD

FIELD OF THE INVENTION

This invention relates to apparatus for transfer and storage of data and, in particular, to apparatus for the transfer and storage of data from a host computing system to a magnetic tape cartridge or the like.

BACKGROUND TO THE INVENTION

In recent years, it has become increasingly common for companies and other such organisations to back-up their computing systems (and other in-house back-up systems) by storing data on a series of magnetic tape cartridges, for retrieval in the event that the data is lost or corrupted in the primary systems.

In some systems, blocks of data are written in sets to a magnetic tape together with parity bytes for error checking purposes. The blocks of data may then be read back and passed through an error checking device to determine whether or not the data blocks have been correctly written to the tape and, if not, to cause those sets in which one or more data blocks are determined to be in error to be rewritten to the tape.

In some cases, one or more large memory blocks are used to store information uniquely identifying the sets of data blocks which have been written to the magnetic tape. The error checker referred to above outputs the header of each data block in a set together with a positive or negative indication as to whether the data block has been found to be good or bad. The system then checks the header received from the error checker against the headers stored in the memory block(s), identifies the corresponding data block and marks the data block as good or bad accordingly.

However, a single error in the header information, will result in the corresponding data block not being recognised. As a result, when the time comes to decide whether or not rewrite a set of data blocks, that data block is marked as bad, even though the data block itself may actually have been written to the magnetic tape and read back correctly. In general, data block headers have error detection but not correction, so errors in the headers can become the dominating cause for rewriting sets of data blocks unnecessarily, which slows the data transfer and storage operation down and uses excessive quantities of tape unnecessarily.

We have now devised an arrangement which overcomes the problems outlined above.

SUMMARY OF THE INVENTION

In accordance with the present invention, there is provided apparatus for transferring data from a host system to one or more magnetic tape storage devices or the like, the apparatus comprising input apparatus for receiving said data, dividing it into blocks and converting said blocks of data to a format suitable for storage on said one or more storage devices, each block of data including header (or supplementary) information, one or more data writers for writing said blocks of data to said one or more storage devices, one or more data readers for reading data written to said one or more storage devices and transferring said data from the one or more data readers to error checking apparatus, said error checking apparatus being arranged to determine whether or not the number of errors in each block of data exceeds a predetermined number and to output the result together with at least a portion of the corresponding information for each block of data, a history store for storing information relating to at least some of the data blocks written to the one or more storage devices, said information including at least a portion of said header (or supplementary) information corresponding to each block of data written to the one or more storage devices, comparison apparatus for comparing the header (or supplementary) information output by the error checking apparatus with the header (or supplementary) information in the history store to identify the data block to which an error checking output relates, and apparatus for marking the data block associated with said matching header (or supplementary) information as being good or bad according to the output of the error checking apparatus, the apparatus further comprising apparatus arranged to cause said comparison apparatus to disregard at least part of the header (or supplementary) information and compare only the remaining portion of said information with the corresponding information in said history store.

Also in accordance with the present invention, there is provided a method for transferring data from a host system to one or more magnetic tape storage devices or the like, the method comprising the steps of receiving said data and dividing it into blocks, converting said blocks of data to a format suitable for storage on said one or more storage devices, each block of data including header (or supplementary) information for uniquely identifying the corresponding data block, writing said blocks of data to said one or more storage devices, reading data written to said one or more storage devices and transferring said data to error checking apparatus, said error checking apparatus being arranged to determine whether or not the number of errors in each block of data exceeds a predetermined number and to output the result together with at least a portion of the corresponding header (or supplementary) information for each block of data, storing in a history store information relating to at least some of the data blocks written to the one or more storage devices, said information including at least a portion of the header (or supplementary) information corresponding to each block of data written to the one or more storage devices, comparing the header (or supplementary) information output by the error checking apparatus with the header (or supplementary) information in the history store to identify the data block to which an error checking output relates, and marking the data block associated with said matching header (or supplementary) information as being good or bad according to the output of the error checking apparatus, the method further comprising the step of disregarding at least part of the header (or supplementary) information and comparing only the remaining portion of said information with the corresponding information in said history store.

The apparatus for disregarding at least part of the header (or supplementary) information when comparing a data block read back from a storage device with the contents of the history store preferably comprises a programmable register or table relating to a plurality of portions of said header (or supplementary) information, each of said portions being able to be set to 'on' or 'off' so that they will be disregarded or taken into account respectively during the comparison process.

The data is preferably written to the tape in codeword quad (or CQ) sets comprising an array of ECC encoded codeword pairs. Each codeword pair is uniquely identified (when read back) by header information comprising a plurality of bits including a parity bit, writepass bits, an acn (actual CQ set number), codeword pair ID bits, and dataset ID bits and, in a preferred embodiment of the invention at least some of the header bits can be selectively masked or otherwise disregarded, and therefore ignored, during the comparison process. In a preferred embodiment, all except the acn bits of the header are masked, such that only the acn bits are used in the comparison process The remaining bits can be considered to contain redundant information As a result, many more codeword pairs having bit-errors in their headers are accepted as being of sufficient quality, thereby reducing the number of rewrites in the presence of bit-errors which would not affect the recovery of data, thereby allowing data to be written faster using less tape.

BRIEF DESCRIPTION OF THE DRAWINGS

An embodiment of the present invention will now be described by way of example only and with reference to the accompanying drawings, in which:

FIG. 1 is a schematic block diagram illustrating the flow of data from a host computing system through a magnetic tape drive according to an exemplary embodiment of the present invention, FIG. 2 is a schematic diagram illustrating the structure of a dataset;

FIG. 5 is a schematic diagram illustrating a codeword quad;

FIG. 6 is a table illustrating information contained in a codeword pair header;

FIG. 7 is a schematic diagram illustrating the sequence in which data might be written to a magnetic tape head;

FIG. 8 is a schematic block diagram of apparatus according to an exemplary embodiment of the present invention; and FIG. 9 is a table illustrating the various masking options available in this exemplary embodiment of the present invention.

DETAILED DESCRIPTION OF THE INVENTION

Figure 3:
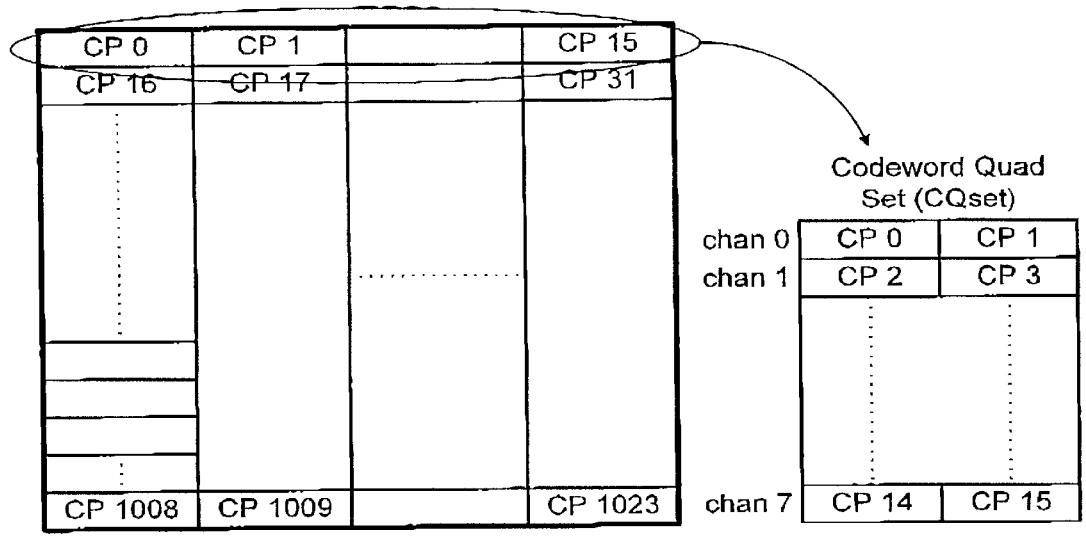
FIG. 3 is a schematic diagram illustrating the conversion of a dataset to a codeword quad.

Referring to FIG. 1 of the drawings, there is illustrated schematically a system for transferring data from a host computing system 100 to a magnetic tape cartridge 102 according to an exemplary embodiment of the present invention. Typically, data is output from the host computing system 100 in short, sharp bursts, where it is much more desirable to provide a steady Stream of data to a read head for storage on a magnetic tape cartridge 102, in order to minimise wear on the read head motors and optimise the efficiency and storage capacity of the tape cartridge. Thus, data from the host computing system 100 is buffered in a burst buffer 104 before transfer to a logical formatter 106, where data is compressed and converted to a format suitable for storage on the magnetic tape cartridge 102. The logical formatter 106 arranges the data into 'datasets', as shown in FIG. 2 of the drawings, in which there is illustrated schematically a dataset 110, consisting of 16 sub datasets 112, each containing 54 rows of data.

The datasets 110 are written sequentially into a main buffer 114. As each row of a dataset 110 is written into the main buffer 114, it is notionally split into two sets of data, and 6 parity bytes (Reed-Solomon) are added to each set by a C1 generator to produce two codewords. The bytes of the two codewords in each row are interleaved to produce a matrix of 480-byte C1 codeword pairs (CCP's) which is stored in the main buffer 114 before transfer to a physical formatter 116. As described above, each row of the matrix is arranged such that it comprises one interleaved codeword pair, the even-numbered bytes forming the first codeword of the codeword pair and the odd-numbered bytes forming the second codeword of the codeword pair.

Datasets 110 are taken sequentially from the main buffer 114 by the physical formatter 116 and written to the magnetic tape 102. Prior to writing the data to the tape 102, the physical formatter 116 adds a 10-byte header 118 to each CCP. It also notionally splits each sub dataset 112 into C2 codewords and adds 10 parity bytes to each The header 118 consists of, among other things, a dataset number and a CCP designator to indicate which dataset a CCP comes from and where in that dataset the CCP was located. This information is important when it comes to retrieving the data from the magnetic tape. The physical formatter 116 also RLL (run length limited) encodes all data and adds synchronisation fields.

Figure 4:
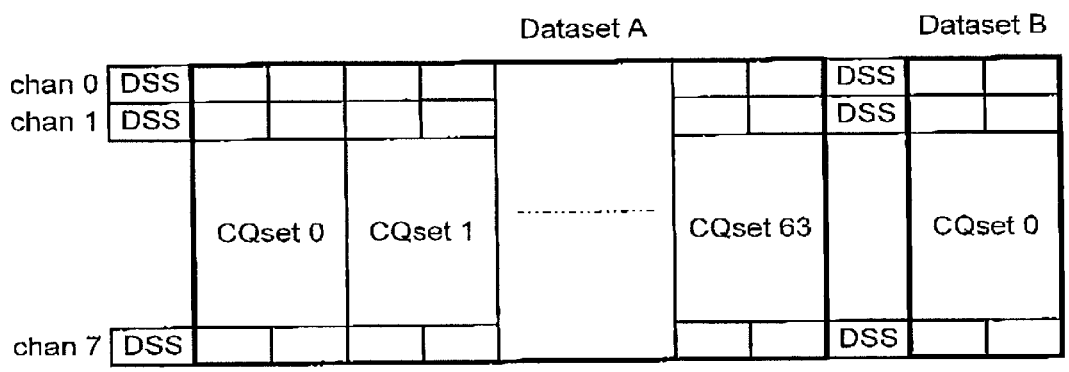
FIG. 4 is a schematic diagram illustrating the format of data written to a magnetic tape head.

In a tape drive for use in an exemplary embodiment of the present invention, there are eight write heads or channels for simultaneously writing data to tape. Thus, the physical formatter 116 includes a 'CQ writer', which takes each row of a dataset in turn, and converts it into a Codeword Quad (or CQ) set Referring to FIG. 3 of the drawings, a CQ set comprises a 2×8 array containing the 16 CCP's in a row of a dataset Each row of the CQ set is then written to tape via a respective one of the 8 channels. This has the benefit of spreading the C2 codewords along the the fill physical length of a dataset on tape, thereby minimising the chance of media defects exceeding the C2 correction budget for any particular codeword. Thus, a dataset is written as 64 CQ sets, as shown in FIG. 4 of the drawings, and written to tape, each CQ set being separated by a DataSet Separator (Or DSS) tone, the DSS consisting of a repeated binary pattern.

In more detail, a CQ set is in fact formed of 8 codeword quads (CQ's) which are produced by adding header information to two codeword pairs. A codeword quad is illustrated schematically in FIG. 5 of the drawings. As shown, in a codeword quad, a 10-byte header prefixes each codeword pair, each 10-byte codeword pair header containing the information shown in FIG. 6. The codeword identifier uniquely identifies the codeword pair and codeword quad set to which it belongs. The write pass identifier identifies the write pass on which the dataset was written. The absolute CQ sequence number (ACN) is a number which is 1 greater than the ACN of the CQ set written immediately before it on tape, or zero if the ACN of the previous CQ set is a maximum. The ACN is the same in all codeword pair headers in a CQ set. Finally, the header parity is a Reed-Solomon code.

A read head (not shown) follows each write head to read back data just written to the magnetic tape so that the written data can be evaluated for quality while data is still being written to the tape. A C1 checker block checks the data read by the read head and determines whether or not there are any errors in the CCP's of each CQ set. If a codeword is found to contain less than a predetermined number of errors, the C1 checker block returns a positive output for that codeword. If, however, more than a predetermined number of errors are detected in a codeword, the checker block returns a negative output (C1 failure) for that codeword. The predetermined number is determined by the error detection correction capability of the data, retrieval apparatus and may be any integer between O and n, where =n is the maximum number of errors which can be detected and corrected by the data retrieval apparatus according to its error correction scheme (in this case 3). A write chain controller (not shown) receives the output from the C1 checker block (known as the CCP RWW status) and, if the number of C1 failures in a CCQ set exceeds a predetermined number, it causes that CCQ set to be rewritten. This process is known as Read While Write (RWW) Retry.

Obviously, there will be some latency, i.e. delay, between the write chain controller initially causing a CQ set to be written to tape, and receiving a negative output from the checker block for that CQ set. Thus, a number of intervening CQ sets will have been written to tape before the faulty CQ set is rewritten. Referring to FIG. 7 of the drawings, CQ sets a, b, c and d are sequentially written to tape. By the time CQ set d has been written to tape, the write chain controller has received a number of C1 failures from the C1 checker for CQ set b which exceeds the predetermined threshold, and causes this CQ set to be rewritten. It then resumes sequentially writing CQ sets e and f before receiving sufficient C1 failures (again) from the C1 checker for the rewritten CQ set b, and causing this CQ set to be rewritten once again.

In fact, the write chain controller (WCC) could be implemented as a very straightforward sequencer if the RWW function were not needed. The inclusion of the RWW function in the WCC necessitates the provision of means for storing the history of CQ sets written to the magnetic tape so that it can determine whether a CQ set has been written to the tape and, if so, whether it has been rewritten and how many tines, thereby ensuring that all CQ sets have been correctly written to the tape for reliable retrieval of the data when required.

As explained above, in some systems, one or more large memory blocks are used to store the CQ sets (or at least information uniquely identifying the CQ sets) which have been written to the magnetic tape The C1 checker described above outputs the header of each codeword pair in a CQ set together with a positive or negative indication as to whether the codeword pair has been found to be good or bad. The system then checks the header received from the C1 checker against the headers stored in the memory block(s), identifies the corresponding codeword pair and marks the codeword pair as good or bad accordingly.

However, a single error in the header information, will result in the corresponding codeword pair not being recognised. As a result, when the time comes to decide whether or not rewrite a CQ set, that codeword pair is marked as bad, even though the codeword pair itself may actually have been written to the magnetic tape and read back correctly. In general, codeword pair headers have error detection but not correction, so errors in the headers can become the dominating cause for rewriting CQ sets unnecessarily, which slows the data transfer and storage operation down and uses excessive quantities of tape unnecessarily.

Referring to FIG. 8 of the drawings, apparatus according to an exemplary embodiment of the invention comprises an updater 10 which is the entity in charge of deciding which CQ set to write next to a magnetic tape cartridge (not shown) The selected CQ set is sent to a 'next ccp' block 12 for sequencing of CCP's within that CQ set. The 'next ccp' block 12 also requests further CQ sets as necessary.

The selected CQ set is also stored in a history array 14, in case it needs to be rewritten later. The history array 14 is essentially a multiport memory, and this array together with the logic closest to it (not shown) form a history entity.

Another entity, 'NEW CQ set' 16, provides the updater 10 with the next new CQ set to be written. However, if a previously written CQ set needs to be rewritten, then the updater 10 gives them priority over the new CQ sets A quality control block 18 analyses the error checking information returned for each CCP, and produces checkoff signals (to be described later) which are input to the history entity 16. Referring back to FIG. 6 of the drawings, in general, a codeword pair header is considered to be good when the following three conditions hold true simultaneously:

CONDITION 1: PARITY, i.e. the CQ reader function detected no errors using the two parity bytes included in the header itself, or the CQ reader interpolated the header of this CP from a good header;

CONDITION 2: WRITEPASS, i.e. the writepass 6 least significant bits are all correct;

CONDITION 3: EXPECTED HEADER VALUES, i.e. the 4 least significant bits of the dataset ID, the 4 least significant bits of the acn (actual CQ set number), and the CQ set part of the codeword pair designation all match those of a recently written CP that is waiting to be RWW verified in the write chain controller.

The CP codewords themselves are, marked as good or bad by the C1 ECC error checking means according to the above criteria. In fact, each codeword pair includes a header having 1 parity bit, writepass bits, an acn (actual CQ set number), a codeword pair ID and a dataset ID.

Referring to FIG. 9 of the drawings, there is illustrated a table known in this exemplary embodiment of the invention as the WCC_RWW_MASK register, which has been created to prevent too many rewrites caused, in particular, by bad CP headers. If a '1' is placed in any of the masks illustrated in the table of FIG. 9, then the header bit(s) it refers to will be masked, i.e. ignored when comparing a CP header with information stored in the history array.

The manner in which each field of WCC_RWW_MASK works will now be described in more detail. The rww_parity_mask is one of the bits which a user might consider setting. If it is left at 0, any codeword pair whose RWW header has any bit errors will be rejected, and other WCC_RWW_MASK bits will not help to reduce the number of rewrites. Thus, if it required to accept headers with a few random bit errors, this bit should be set to 1. Then, the only headers rejected will be those with incorrect unmasked bits Even if all of the other WCC_RWW_MASK bits are left at 0, this mask can have a significant effect in making RWW more tolerant to random bit-errors and therefore reduce the number of rewrites because the number of header bits which need to be free of errors is reduced from 80 in the complete header to the 20 that the write chain controller actually uses to identify a particular codeword pair. Thus, it would be pointless to place a 1 in any of the other masks unless the rww_parity_mask is 1.

Normally, the 4 least significant bits of the RWW header acn must match those of the codeword pair in order to be checked off. However, if the rww_acn_mask is set to 1, one or more of these four bits can be masked. In fact, if each of these mask bits is set to 1, the entire header acn will be ignored during the comparison process.

The 6 most significant bits of the codeword pair ID in the header identify the logical CQ set of a dataset its codeword pair belongs to. The rww_cqset_mask allows fewer of these bits in the RWW header to be used when matching it to a written CQ set 'waiting to be verified'. In general, it is considered advisable to only mask any of these bits if all 4 acn bits are left unmasked, otherwise there could be cases when a RWW operation causes codeword pairs from more than one CQ set to be checked off.

Normally, all 4 bits of the RWW header dataset ID are checked against ds0_id and ds1_id to determine which dataset they belong to. If no match is found, the RWW information is discarded and no codeword pair is checked off. With the rww_dsid_mask, the matching process can be reduced to fewer than the whole 4 bits. It is, however, recommended to keep at least rww_dsid_mask (0) at 0 unless the rww_dataset_mask is set.#

Finally, the rww_dataset_mask should only be set if it is required to ignore the RWW header dataset ID bits altogether. In this case, the rww_dsid_mask should also be set to all 1's. Again, it is advisable to leave 0's in all 4 bits in rww_acn_mask because otherwise it is possible (although very unlikely) to check off two codeword pairs in the interleave zone, one from each dataset.

Although the present invention has been described by way of examples of a preferred embodiment, it will be evident that other adaptations and modifications may be employed without departing from the scope of the invention as defined by the appended claims. Further, the terms and expressions employed herein have been used as terms of description and not of limitation; and, thus, there is no intent to exclude equivalents, but on the contrary it is intended to cover any and all equivalents which may be employed without departing from the scope of the invention as defined by the appended claims.

What is claimed is:

1. Apparatus for transferring data from a host system to one or more tape storage devices for retrieval if required by data retrieval apparatus, the apparatus for transferring data comprising input apparatus for receiving said data, dividing it into blocks and converting said blocks of data to a format suitable for tape storage on said one or more tape storage devices, each block of data including header (or supplementary) information, one or more data writers for writing said blocks of data to said one or more tape storage devices, one or more data readers for reading data written to said one or more tape storage devices and transferring said data from the one or more data readers to error checking apparatus, said error checking apparatus being arranged to determine whether or not the number of errors in each block of data exceeds a predetermined number and to output the result together with at least a portion of the corresponding header (or supplementary) information for each block of data, a history store for storing information relating to at least some of the data blocks written to the one or more tape storage devices, said information for history store for storing including at least a portion of the header (or supplementary) information corresponding to each block of data written to the one or more tape storage devices, comparison apparatus for comparing the header (or supplementary) information output by the error checking apparatus with the header (or supplementary) information in the history store to identify the data block to which an error checking output relates, and apparatus for marking the data block associated with matching said header (or supplementary) information as being good or bad according to the output of the error checking apparatus, the apparatus for transferring data further comprising apparatus arranged to cause said comparison apparatus to disregard at least part of the header (or supplementary) information and compare only the remaining portion of said header (or supplementary) information with the corresponding information in said history store.

2. Apparatus according to claim 1, wherein said error checking apparatus is arranged to determine whether there are any errors in a block of data and, if so, whether the number of errors in said block of data exceeds a predetermined number, and comprises output apparatus for outputting one or two signals indicating that the number of errors respectively exceeds or does not exceed said predetermined number, wherein said predetermined number may be one of a plurality of numbers between 1 and n, where n is an integer.

3. Apparatus according to claim 2, wherein n is an integer equal to the maximum number of errors which can be detected/corrected in each block of data as defined by an error detection/correction capability of said data retrieval apparatus.

4. Apparatus according to claim 1, wherein the header (or supplementary) information comprises a plurality of bits, including one or more bits for uniquely identifying the corresponding data block.

5. Apparatus according to claim 4, wherein said header information includes one or more of a parity bit, writepass bits, an ACN, a number identifying a set of data blocks, data block bits, and ID bits relating to a set of data blocks.

6. Apparatus according to claim 5, comprising means for selectively disregarding at least some of the header bits during the comparison process.

7. Apparatus according to claim 6, comprising means for selectively masking said at least some header bits.

8. Apparatus according to claim 6, wherein all of the header bits, except the ACN bits, are disregarded, such that only the ACN bits are used in the comparison process.

9. Apparatus according to claim 1, comprising a plurality of parallel tracks by means of which a number of blocks of data are simultaneously written across said one or more storage devices.

10. Apparatus according to claim 9, wherein said one or more data readers comprise a number of parallel read heads for simultaneously reading back a number of blocks of data written to said one or more storage devices.

11. Apparatus according to claim 9, comprising eight parallel tracks.

12. Apparatus according to claim 10, comprising eight parallel read heads.

13. Apparatus according to claim 1, wherein said at least one data reader is positioned such that it follows said at least one data writer and is arranged to read back data just written to said one or more storage devices, whilst data is still being written to said one or more storage devices.

14. A method of transferring data from a host system to one or more tape storage devices, the method comprising the steps of receiving said data and dividing it into blocks, converting said blocks of data to a format suitable for tape storage on said one or more tape storage devices, each block of data including header (or supplementary) information, writing said blocks of data to said one or more tape storage devices, reading data written to said one or more tape storage devices and transferring said data to error checking apparatus, said error checking apparatus being arranged to determine whether or not the number of errors in each block of data exceeds a predetermined number and to output the result together with the at least a portion of the header (or supplementary) corresponding information for each block of data, storing in a history store information relating to at least some of the data blocks written to the one or more tape storage devices, said history store information including at least a portion or the header (or supplementary) information corresponding to each block of data written to the one or more tape storage devices, comparing the header (or supplementary) information output by the error checking apparatus with the header (or supplementary) information in the history store to identify the data block to which an error checking output relates, and marking the data block associated with matching said header (or supplementary) information as being good or bad according to the output of the error checking apparatus, the method further comprising the step of disregarding at least part of the header (or supplementary) information and comparing only the remaining portion of said header (or supplementary) information with the corresponding information in said history store.

15. A method according to claim 14, wherein the data is written to the storage means in blocks of data comprising a plurality of codeword pairs, each codeword pair being uniquely identified by header information comprising a plurality of bits.

16. A method according to claim 15, wherein said header information includes one or more of a parity bit, writepass bits, an ACN (actual CQ set number), codeword pair ID bits, and dataset ID bits.

17. A method according to claim 15, further comprising the step of selectively disregarding or masking at least some of said header bits such that they are ignored during the comparison process.

18. A method according to claim 16, further comprising the step of disregarding or masking all of the header bits except the ACN bits, such that only the ACN bits are used in the comparison process.

* * * * *